United States Patent

Baechler et al.

[11] Patent Number: 5,743,552
[45] Date of Patent: Apr. 28, 1998

[54] BABY STROLLER

[75] Inventors: Philip A. Baechler; Michael F. Arnold; Joseph P. Delorme, all of Yakima, Wash.

[73] Assignee: Racing Strollers, Inc., Yakima, Wash.

[21] Appl. No.: 583,566

[22] Filed: Jan. 5, 1996

[51] Int. Cl.$^6$ .................................................. B62B 7/06
[52] U.S. Cl. .......................... 280/642; 280/650; 280/62
[58] Field of Search ............................ 280/62, 641, 642, 280/650, 35, 11.28, 63, 658

[56] References Cited

U.S. PATENT DOCUMENTS

| | | | |
|---|---|---|---|
| D. 297,525 | 9/1988 | Baechler | D12/129 |
| D. 301,850 | 6/1989 | Clement et al. | D12/129 |
| D. 315,885 | 4/1991 | Jacobs | D12/129 |
| 324,364 | 8/1885 | Cornelius | 280/11.28 X |
| D. 343,812 | 2/1994 | Baechler et al. | D12/129 |
| D. 350,923 | 9/1994 | Schmidlin et al. | D12/12 |
| 699,186 | 5/1902 | Katzke . | |
| 928,622 | 7/1909 | Johnson | 280/62 |
| 2,425,688 | 8/1947 | Schulte | 280/36 |
| 2,607,607 | 8/1952 | Day | 280/62 |
| 4,506,906 | 3/1985 | Allden | 280/642 |
| 4,902,027 | 2/1990 | Skelly | 280/33.998 |
| 4,934,728 | 6/1990 | Chen | 280/644 |
| 4,953,880 | 9/1990 | Sudakoff et al. | 280/47.38 |
| 5,029,891 | 7/1991 | Jacobs | 280/650 |
| 5,076,599 | 12/1991 | Lockett et al. | 280/204 |
| 5,123,670 | 6/1992 | Chen | 280/650 |
| 5,176,395 | 1/1993 | Garforth-Bles | 280/415.1 |
| 5,188,389 | 2/1993 | Baechler et al. | 280/650 |
| 5,224,720 | 7/1993 | Chaw et al. | 280/62 |
| 5,259,635 | 11/1993 | Picker | 280/250.1 |
| 5,299,825 | 4/1994 | Smith | 280/644 |
| 5,344,171 | 9/1994 | Garforth-Bles | 280/415.1 |
| 5,356,171 | 10/1994 | Schmidlin et al. | 280/650 |
| 5,364,119 | 11/1994 | Leu | 280/647 |
| 5,465,996 | 11/1995 | Wisz | 280/35 X |
| 5,476,275 | 12/1995 | Baechler et al. | 280/62 X |
| 5,522,614 | 6/1996 | Eyman et al. | 280/642 |
| 5,536,033 | 7/1996 | Hinkston | 280/62 X |

*Primary Examiner*—Brian L. Johnson
*Assistant Examiner*—Michael Mar
*Attorney, Agent, or Firm*—Seed and Berry LLP

[57] ABSTRACT

A foldable all-terrain baby stroller with an economical construction. The stroller has a tubular rear axle having left and right wheels mounted thereto and left and right laterally spaced-apart base frame members. The base frame members have flat forward end portions with a notch therein to receive the axle of a front wheel and flat rearward end portions with a hole therein sized to rotatably receive the rear axle. A spacer tube is coaxially mounted on the rear axle between the rearward portions of the base frame members to prevent inward movement thereof. Left and right upright frame members each have a lower end welded directly to the rear axle laterally outward of the rearward end portions of the corresponding left and right base frame members to prevent laterally outward movement thereof on the rear axle. Left and right inclined upper frame members are pivotally attached to the upper end portions of the corresponding upright frame members and have forward end portions which are rigidly connected together to move as a unit by an attachment member extending therebetween. A coupler is attached to the base frame members and has an upper plate and a lower plate spaced apart to define a substantially unobstructed receiver opening therebetween sized to releasably receive therein the forward end portions of the upper frame members and the attachment member. A lock pin is received within holes in the upper and lower coupler plates and the attachment member to releasably secure the forward end portions of the upper frame members in the receiver opening.

28 Claims, 4 Drawing Sheets

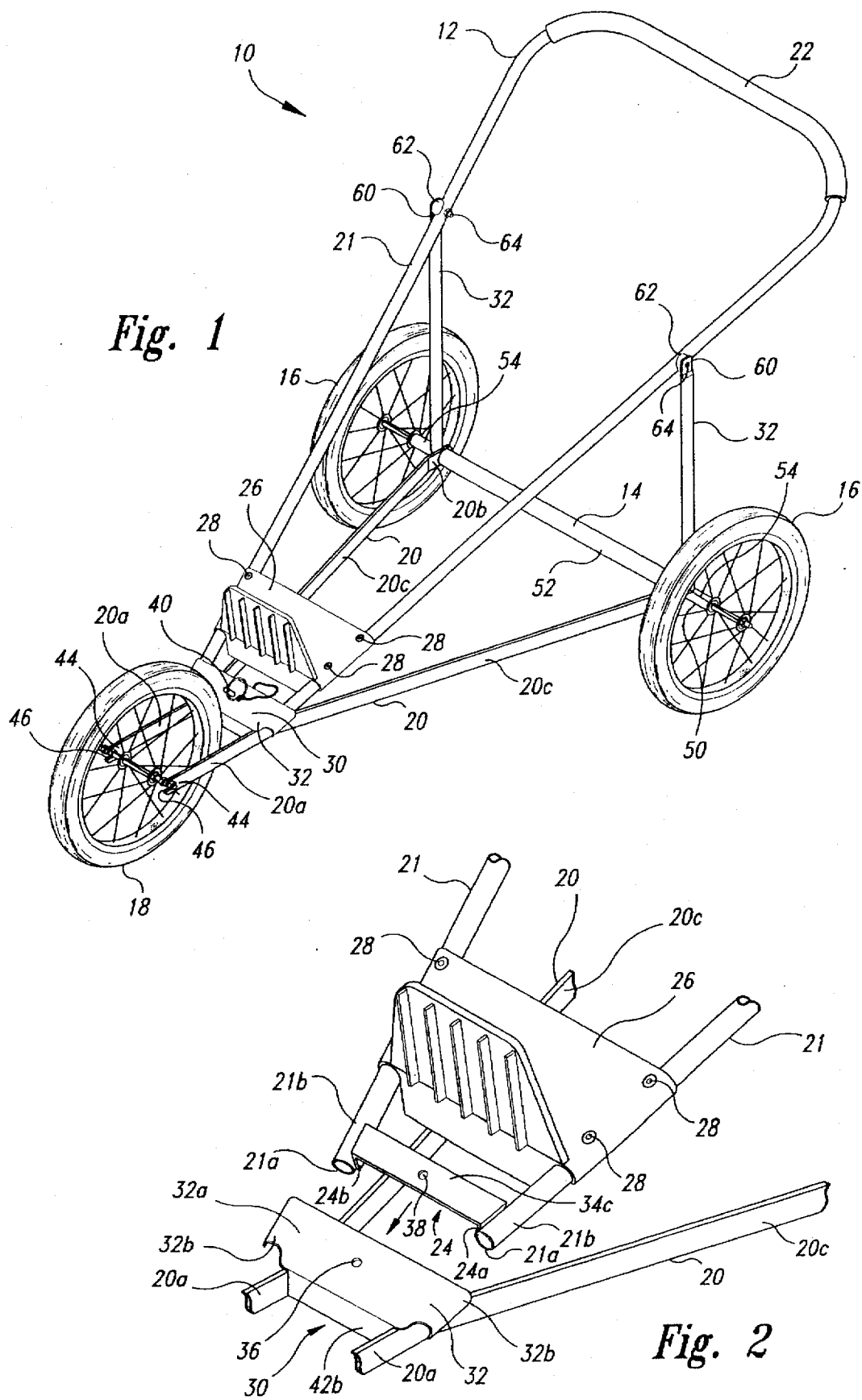

BABY STROLLER

TECHNICAL FIELD

The present invention relates to baby strollers, and more particularly, to all-terrain baby strollers that can be folded.

BACKGROUND OF THE INVENTION

Traditionally, baby strollers have been used to push an infant slowly on a relatively hard, smooth floor or sidewalk. As a result, the strollers were made small and light. These strollers work well enough at slow speed, but are extremely unwieldy and even dangerous on rough surfaces or at higher speeds.

As parents have become more health conscious in recent times, jogging and fast walking has become a popular pastime. Because baby strollers were not designed to be operated at high speed or on rough terrain, parents could jog or walk fast only when another person was available to baby-sit. As any parent knows, it is not always easy to find baby-sitters, so the ability of the parent to stay in shape by jogging or fast walking was severely limited.

Even for non-jogging parents, the need for an improved baby stroller has been apparent. The small, plastic wheels customarily used for the baby strollers are almost useless when it is desired to walk with an infant in a grassy park or on a rough road or sidewalk. Parents end up not walking with the infant at all or only walking in limited areas.

All-terrain baby strollers have been designed to overcome these problems. These strollers typically employ much larger wheels, often large bicycle tires. The stroller frame members are constructed of heavy duty metal tubular stock and durable plastic frame connectors are used to connect the frame members together to provide the stroller with a construction that is strong enough to handle the heavy duty use they may receive. The frame connectors are used to connect some frame members to others, sometimes while allowing one frame member to rotate or pivot relative to the other, and are used to removably connect other frame members together. Such plastic frame connectors tend to be complicated in construction and expensive to purchase, and time consuming to attach to the metal tubular frame members during the manufacturing process. As a result, the cost of manufacturing all-terrain baby strollers is more expensive than desired to provide such strollers for sale at a low enough price that more consumers can afford to purchase all-terrain strollers. While a low cost construction is desired, them is still a need to produce a strong stroller that can handle the rigors of use while jogging and fast-walking, and even just slow walking in grassy, bumpy areas or over other rough terrain.

It is also desirable to design all-terrain strollers so that they fold for transportation and storage, especially in the trunk of a car. It is also desirable to design the all-terrain stroller so that it can be disassembled to the extent needed for folding without tools and without significant user strength or difficulty. Of course, it is desirable to allow re-assembly without requiring tools, or great strength or mechanical skills on the part of the user.

The present invention solves these problems by providing a less expensive to manufacture all-terrain stroller which has a strong construction, but is quickly and easily folded and unfolded without using tools.

SUMMARY OF THE INVENTION

The present invention resides in a foldable baby stroller having a forward wheel, and a base frame having left and right laterally spaced-apart base frame members and a laterally extending tubular rear axle. The rear axle has left and right ends. The left arid right base frame members each have a forward end portion and a rearward end portion. The forward end portion has a corresponding one of left and right forward wheel axle end portions mounted thereto with the forward wheel position between the forward end portions of the left and right base frame members. The rearward end portion is attached to the mar axle. This stroller further includes a left rear wheel mounted to a left end of the rear axle, and a right rear wheel mounted to a right end of the rear axle.

The stroller has left and right generally upright frame members each having an upper end portion and a lower end portion. The lower end portions of the left and right upright frame members am attached to the base frame toward the rear axle.

Left and right upper frame members are provided, each having a lower forward end portion. The left and right upper frame members are attached together toward a raised rearward end portion thereof to form a handle for grasping by a user. The forward end portions of the left and right upper frame members am rigidly connected together to move as a unit by an upper frame attachment member extending therebetween. The upper end portions of the left and right upright frame members are pivotally attached to the left and right upper frame members, respectively, at a position toward the rearward end portions of the left and right upper frame members.

The stroller further includes a coupler attached to the left and right base frame members and rigidly connecting the left and right base frame members together at a location rearward of the forward wheel. The coupler includes an upper coupler member and a lower coupler member spaced apart therefrom to define a substantially unobstructed receiver opening therebetween sized to releasably receive therein the forward end portions of the left and right upper frame members and the upper frame attachment member.

At least the upper coupler member and the upper frame attachment member each have a hole therein sized and aligned to receive a lock pin to releasably secure the forward end portions of the left and right upper frame members in the receiving opening. At least one of the upper and lower coupler members have laterally outward end portions which extend toward the other of the upper and lower coupler members to provide a lateral guide as the forward end portions of the left and right upper frame members are moved into the receiver opening and prevent lateral movement thereof when in the receiver opening. The forward end portions of the left and right upper frame members are inclined at a preselected angle when the stroller is fully assembled. The upper and lower coupler members are angularly oriented so that the receiver opening extends rearwardly with an upward angular orientation at the preselected angle and the receiver opening opens rearwardly.

In accordance with another aspect of the invention, the forward end portion of the left and right base frame members has a flat portion with a notch therein sized to receive a corresponding one of the left and right forward wheel axle end portions therein. Further, the rearward end portions of the left and right base frame members each have a flat portion with a hole formed therein sized to rotatably receive the rear axle therein. A spacer tube is coaxially mounted on the rear axle between the rearward end portions of the left and right base frame members. In the illustrated embodiments, the spacer tube extends fully between the rearward end portions and has left and right end walls sized to prevent inward movement of the rearward end portions of the base frame members on the rear axle.

In the illustrated embodiments, the lower end portions of the left and right upright frame members are fixedly attached to the base frame members toward the rear axle. In the illustrated embodiments, the lower end portion of the left upright frame member is fixedly attached directly to the rear axle toward the left end thereof and laterally outward of the rearward end portion of the left base frame member to prevent laterally outward movement of the rearward end portion of the left base frame member on the rear axle. Similarly, the lower end portion of the right upright frame member is attached directly to the rear axle toward the right end thereof and laterally outward of the rearward end portion of the right base frame member to prevent laterally outward movement of the rearward end portion of the right based frame member on the rear axle. In the illustrated embodiment, the lower end portions of the upright frame members are welded to the rear axle.

In one illustrated embodiment, the left and right base frame members are each fabricated from a flat bar. In another illustrated embodiment, the left and right base frame members are each fabricated from a tube with a forward end portion thereof pinched to form the forward flat portion with the notch therein, and with a rearward end portion pinched to form the rearward flat portion with the hole formed therein. The forward end portions of the left and right base frame members are in spaced-apart parallel arrangement. The forward end portions of the left and right base frame members are rigidly connected together by a base frame attachment member extending therebetween at a location rearward of the front wheel.

In one illustrated embodiment, the stroller further includes left and right spacer tubes coaxially mounted on the rear axle. The rearward end portion of the left base frame member is spaced apart on the rear axle from the lower end portion of the left upright frame member with the left spacer tube positioned and extending fully therebetween to prevent laterally outward movement of the rear end portion of the left based frame member on the rear axle. Similarly, the rearward end portion of the right base frame member is spaced apart on the rear axle from the lower end portion of the right upright frame member with the right spacer tube positioned and extending fully therebetween to prevent laterally outward movement of the rearward end portion of the right base frame member on the rear axle.

Other features and advantages of the invention will become apparent from the following detailed description, taken in conjunction with the accompanying drawings.

BRIEF DESCRIPTION OF THE DRAWINGS

FIG. 1 is an isometric view of a baby stroller embodying the present invention shown in an upright position for use, but without a seat being shown.

FIG. 2 is an enlarged, fragmentary, isometric view of a forward portion of the upper frame of the stroller of FIG. 1 shown disconnected from a lower frame coupler.

DETAILED DESCRIPTION OF THE INVENTION

Figure 3:
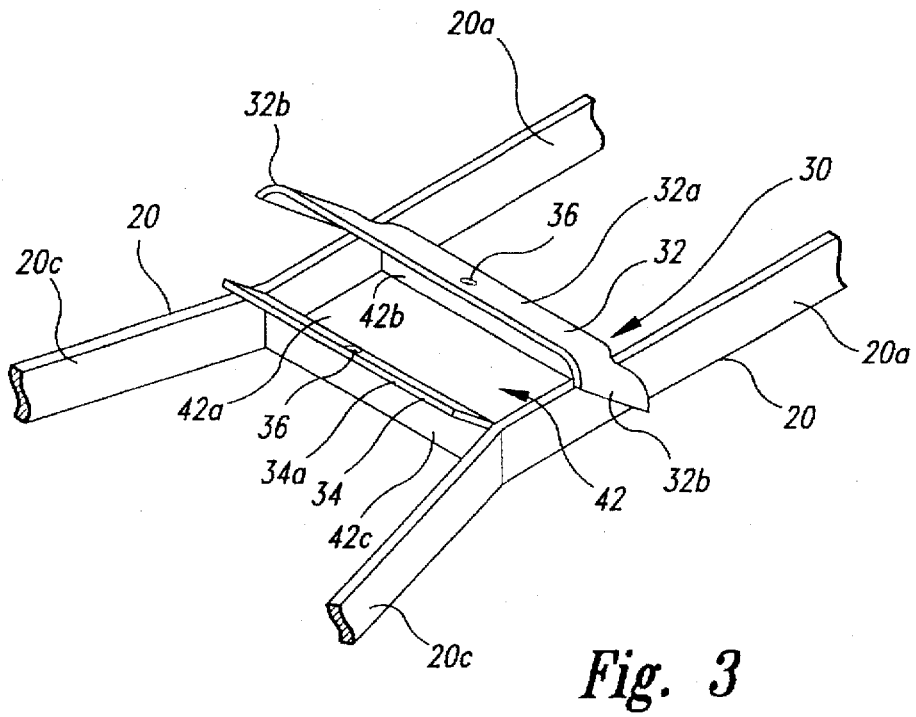
FIG. 3 is a rearward, fragmentary, isometric view of the lower frame shown in FIG. 2.

As shown in the drawings for purposes of illustration, the present invention is embodied in an all-terrain baby stroller 10 having a foldable frame 12 and a transversely extending rear axle assembly 14 designed to permit folding of the frame. Left and right side rear wheels 16 are rotatably mounted to the rear axle assembly 14. The forward end of the frame 12 has a single front wheel 18 rotatably mounted thereto.

The frame 12 includes left and right side horizontal base frame members 20 extending rearwardly from the front wheel 18 to the rear axle assembly 14. The base frame members 20 each have a forward portion 20a extending from the front wheel 18 rearward in parallel configuration with the forward portion of the other base frame member, and a rearward portion 20b at the rear axle assembly 14 in parallel configuration with the rearward portion of the other base frame member. The base frame members 20 each also include a midportion 20c extending from the forward portion 20a rearwardly to the rearward portion 20b in a rearwardly diverging configuration. The base frame members 20 are each fabricated from a steel flat bar bent as described above, and cut and drilled as will be described below to produce an inexpensive to manufacture base frame having sufficient structural strength.

The frame 12 also includes left and right side, downwardly sloping upper frame members 21 which extend from a handle 22 in a converging configuration to the base frame members 20 at a position near the rearwardmost extent of the front wheel 18. The left and right side upper frame members 21 are integrally formed with the handle 22 by bending a single length of steel tube. To reduce cost, the forward ends 21a of the upper frame members 21 terminate as an open tube end without use of a plastic termination, as shown in FIG. 2.

The forward end portions 21b of the upper frame members 21 are rigidly attached together by a brace 24. The brace 24 is fabricated from a steel flat bar and has downwardly bent left and right end portions 24a and 24b, respectively, and a straight midportion 24c extending therebetween. The midportion 24c has a length to position the end portions 24a and 24b to an inward side of and adjacent to the forward end portions 21b of the corresponding left and right side upper frame members 21. The left and right end portions 24a and 24b of the brace 24 are each welded to the forward end portion 21b of a corresponding one of the left and right side upper frame members 21 such that the brace 24 rigidly holds the forward end portions 21b of the upper frame members 21 in a desired fixedly spaced apart relation. A foot rest 26 also spans between the left and right side upper frame members 21, above the brace 24, and is attached to each by a pair of rivets 28 to further help fixedly hold the forward end portions 21b of the upper frame members 21 in the desired spaced apart relation, in addition to providing a place for resting the feet of a child being carried in a hung cloth seat (not shown) supported by the upper frame members 21 in a conventional manner.

The forward end portions 21b of the upper frame members 21 are releasably coupled to the horizontal base frame members 20 by a coupler 30, which will be described in greater detail below, to permit folding of the stroller 10. The handle 22 is positioned at a height convenient for a user to push the stroller 10 when in the fully assembled/unfolded configuration. The frame 12 further includes left and right side upright support tubes 31 extending between the rear axle assembly 14 and the left and right side upper frame members 21 at a position below and forward of the handle 22.

The coupler 30 is best illustrated in FIGS. 2 and 3, and includes an upper plate 32 and a lower plate 34 spaced apart by a sufficient distance to snugly and slidably receive therebetween the forward end portions 21b of the upper frame members 21. When the forward end portions 21b are in position between the upper and lower plates 32 and 34, the brace 24 which rigidly connects the forward portions 21b together is also positioned between the upper and lower plates. The upper and lower plates 32 and 34 define a substantially unobstructed rearwardly facing opening sized to releasably receive therein as a unit the forward end portions 21b and the brace 24. The upper and lower plates 32 and 34 are arranged parallel to each other and have a rearwardly upward angular orientation to match the angular orientation of the upper frame members 21 when the stroller 10 is in its fully assembled/unfolded configuration. The upper and lower plates 32 and 34 each have a hole 36 in a midportion 32a and 34a thereof positioned to align with a hole 38 in the midportion 24c of the brace 24 when the forward end portions 21b of the upper frame member 21 are fully inserted between the upper and lower plates 32 and 34 of the coupler 30. The holes 36 and 38 are sized to snugly and slidably receive a lock pin 40, shown inserted in FIG. 1.

The upper plate 32 has left and right side end portions 32b which curve toward the lower plate 34 with a curvature matching the radius of the forward end portions 21b of the upper frame members 21 to help in aligning the hole 38 in the brace 24 with the holes 36 in the coupler 30 upon insertion of the forward end portions 21b between the upper and lower plates 32 and 34 of the coupler, and to prevent the lateral movement of forward end portions 21b while within the coupler. Of course, the lock pin 40 also prevents such lateral movement of the forward end portions 21b as well as their unintended removal from the coupler 30.

The coupler 30 also serves to rigidly hold the forward portions 20a of the base frame members 20 in a desired fixedly spaced apart relation at a location just forward of the rearwardly diverging midportion 20c of the base frame members. The coupler 30 includes an open sided rectangular channel portion 42 having a lower side 42a, a forward side 42b and a rearward side 42c. The left and right side ends of the forward and rearward sides 42b and 42c are each welded to a corresponding one of the forward portions 20a of the left and right side base frame members 20 to provide torsional stiffening to the base frame members and produce a strong stroller design in addition to providing the desired spacing between the forward portions 20a of the base frame members. The upper plate 32 is rigidly attached to an upper edge of the forward side 42b of the channel portion 42, and the lower plate 34 is rigidly attached to an upper edge of the rearward side 42c of the channel portion. In the illustrated embodiment of the coupler 30 the upper and lower plates 32 and 34, and the lower, forward and rearward sides 42a, 42b and 42c of the channel portion 42 are integrally formed by bending a steel sheet to the desired shape.

By rigidly connecting together the forward end portions 21b of the upper frame members 21 using the brace 24 and the spaced apart upper and lower plates 32 and 34 of the coupler 30, both of the left and right side upper frame members can be easily and quickly removably connected in unison to the base frame members 20 and disconnected therefrom utilizing only the single lock pin 40. Not only is this design desirable for the user to facilitate folding and unfolding of the stroller 10, it is less expensive to manufacture than prior art designs that utilized plastic connectors and designs that require each of the left and right side upper frame members to be separately connected to a corresponding one of the base frame members. Also, the coupler 30 adds additional torsional strength to the base frame members 20 and maintains the spacing of the base frame members to allow the fabrication of the base frame members from less expensive but more flexible steel flat bar.

The use of steel flat bar for the base frame members 20 also reduces the cost to fabricate the stroller 10 in other ways. For example, rather than using plastic fork tip caps for removable attachment of the front wheel 18 to the forwards ends of the base frame tubes as done with prior art strollers, as shown in FIG. 1, a forward end portion 44 of the forward portion 20a of each of the base frame members 20 simply has a forwardly opening notch 46 cut directly therein and sized to receive the left and right side end portions of the axle of the forward wheel 18. In such manner, the axle end portions of the forward wheel 18 can be slid into position in the notches 46 of the forward end portions 44 between the axle nuts of the forward wheel, and the axle nuts then tightened to hold the forward wheel in position. It is noted that the coupler 30 rigidly holds the forward positions 20a of the base frame members 20 spaced apart by the same distance as does the front wheel 18 when mounted to the forward end portions 44.

Figure 4:
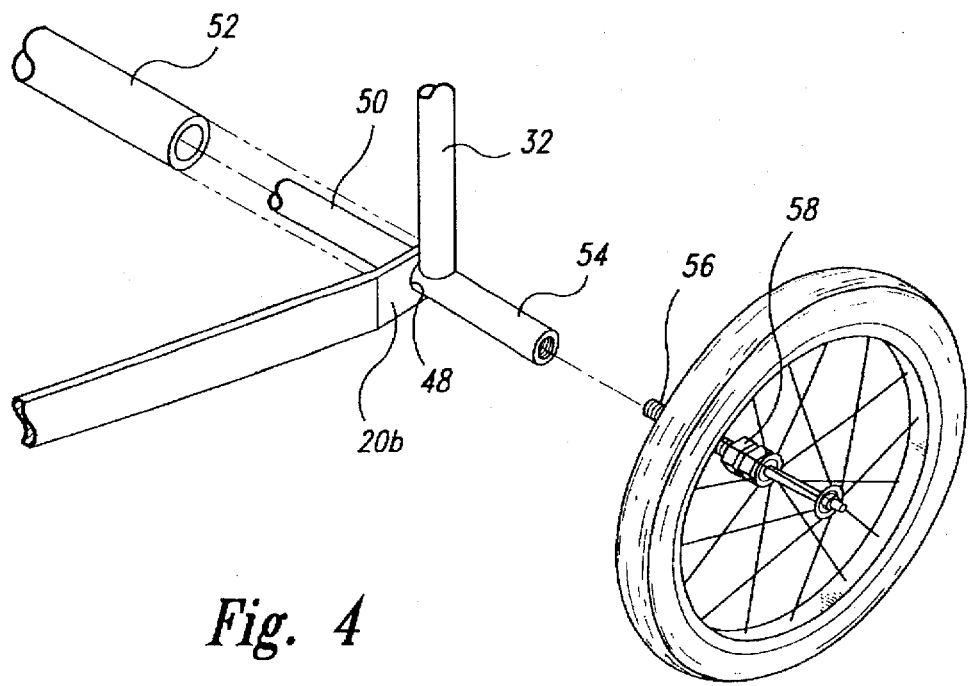
FIG. 4 is an enlarged, exploded, fragmentary, left side view of the base frame and left wheel of FIG. 1.

The use of steel flat bar for the base frame members 20 also helps to reduce the cost to fabricate the stroller 10 by allowing an inexpensive pivotal connection of the base frame members 20 to the rear axle assembly 14. As best illustrated in FIGS. 1 and 4, the rearward portion 20b of each of the base frame members 20 simply has a hole 48 formed therein by drilling and sized to receive therethrough an axle tube 50 without the use of plastic couplers. The axle tube 50 is rotatably received within the holes 48 of the base frame members 20 to permit the rotation of the base frame members relative to the rear axle assembly 14 upon folding and unfolding of the stroller 10. The rearward portions 20b of the left and right side base frame members 20 are held in position against inward axial movement on the axle tube 50 by a central spacer tube 52 that is loosely mounted coaxially on the axle tube between rearward portions of the left and right base frame members. The central spacer tube 52 has annular left and right end walls with a diameter sized relative to the hole 48 in the rearward portion 20b of the corresponding one of the base frame members 20 so as to engage the rearward portion and prevent inward axial movement. The rearward portions 20b of the left and right side base frame members 20 are held in position against outward axial movement on the axle tube 50 by the left and right upright support tubes 31 which are each welded at a lower end directly to the axle tube 50 at a position axially outward of and adjacent to a corresponding one of the rearward portions 20b of the left and right side base frame members. The rearward portions 20b are effectively clamped between the upright support tubes 31 and the central spacer tube 52. In such fashion, the base frame members 20 are inexpensive to manufacture but yet allow the axle tube 50 and the upright support tubes 31 welded thereto to rotate relative to the base frame members for folding and unfolding of the stroller 10.

Left and right end portions 54 of the axle tube 50 are open and internally threaded to receive a threaded stub axle 56 of a corresponding one of the rear wheels 16. A lock nut 58 when tightened against the end face of the axle end portion 54 locks the stub axle 56 against loosening during usage of the stroller 10.

The left and right side upright support tubes 31 are fabricated from steel tubes, each have an upper end that is pinched or crimped to form a flat end portion 60, as illustrated in FIG. 1. A plastic bushing 62 is positioned between the flat end portion 60 and a corresponding one of the left and right upper frame members 21. A bolt 64 passes through coaxially aligned holes in the flat end portion 60, the bushing 62 and the upper frame member 21 to pivotally hold the flat end portion 60 of the upright support tube 31 to the upper frame member to permit rotation therebetween for folding and unfolding of the stroller 10. This provides for inexpensive fabrication without the use of plastic couplers.

To fold the stroller when fully assembled, the user first pulls the lock pin 40 from the holes 36 and 38 in the upper and lower plates 32 and 34 of the coupler 30 and the brace 24. Next, the forward end portions 21b of the upper frame members 21 are pulled together as a unit from between the upper and lower plates 32 and 34 of the coupler 30. The upper frame members 21 are then moved forward to lower the upper frame members toward the base frame members 20. To accomplish the required movement of the upper frame members 21 relative to the coupler 30 and the lower frame members 20, the upright support tubes 31 must be free to pivot at their upper ends relative to the upper frame members, as described above, and free to pivot at their lower ends relative to the lower frame members, as described above. Since the upright support tubes 31 are welded directly to the axle tube 50, both the upright support tubes and the axle tube are rotated as a unit relative to the base frame members 20 to fold the stroller 10. To unfold the stroller the process is simply reversed.

Figure 5:
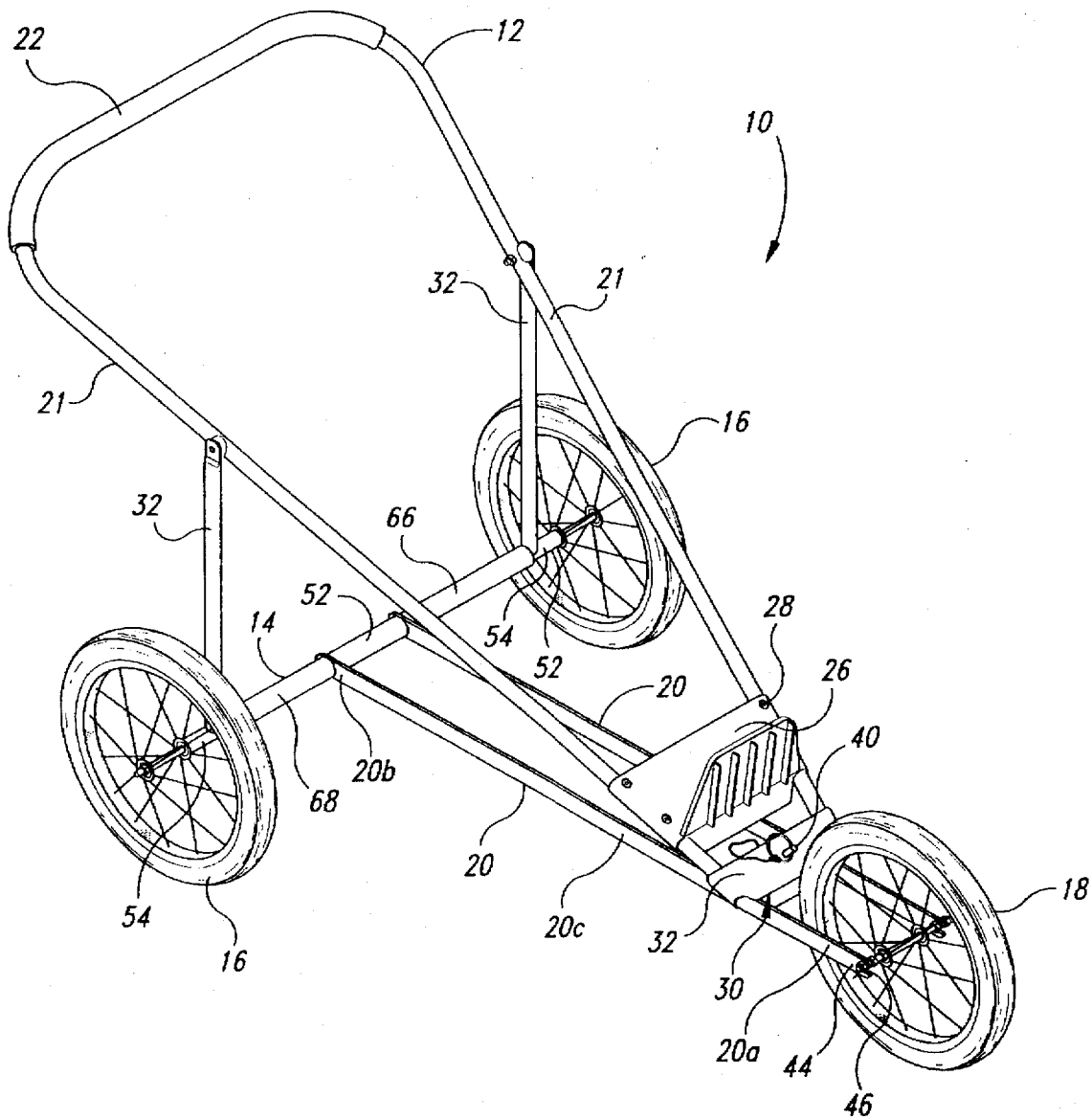
FIG. 5 is an isometric view of a first alternative embodiment of the stroller of FIG. 1 embodying the present invention.

A first alternative embodiment of the stroller 10 is shown in FIG. 5. In this embodiment the base frame members 20 are not bent but extend straight back from their forward portion 20a to their rearward portion 20b at the rear axle assembly 14 in parallel configuration. As a result, the rear axle assembly 14 utilizes a shortened central spacer tube 52, and additional left and right sides spacer tubes 66 and 68, respectively. The left side spacer tube 66 is positioned coaxially on the axle tube 50 between the rearward portion 20b of the left side base frame member 20 and the left side upright support tube 31 to prevent axially outward movement of the left side rearward portion on the axle tube. The right side spacer tube 68 is positioned coaxially on the axle tube 50 between the rearward portion 20b of the right side base frame member 20 and the right side upright support tube 31 to prevent axially outward movement of the right side rearward portion on the axle tube. In all other regards the first alternative embodiment is constructed as described for the embodiment of FIG. 1.

Figure 6:
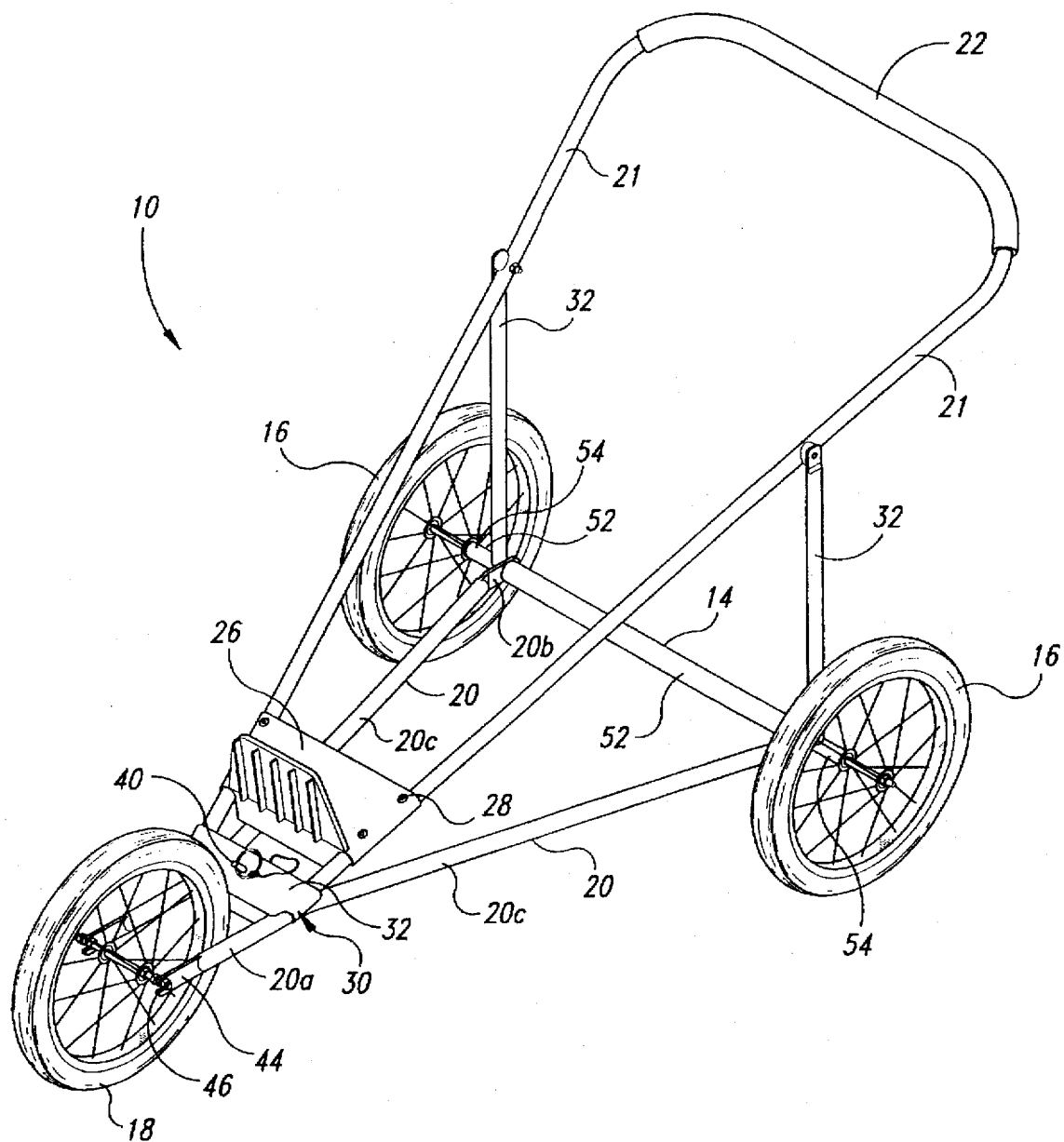
FIG. 6 is an isometric view of a second alternative embodiment of the stroller of FIG. 1 embodying the present invention.

A second alternative embodiment of the stroller 10 is shown in FIG. 6, and has the same construction as described in the embodiment of FIG. 1 except that instead of using steel flat bars for the base frame members 20, each is fabricated from a bent steel tube with the forward end portion 44 thereof pinched or crimped to form a flat end portion in which the notch 46 is cut. Similarly, the rearward portion 20b of each of the base frame members 20 is pinched or crimped to form a flat end portion in which the hole 48 is formed.

It will be appreciated that, although specific embodiments of the invention have been described herein for purposes of illustration, various modifications may be made without departing from the spirit and scope of the invention. Accordingly, the invention is not limited except as by the appended claims.

We claim:

1. A foldable baby stroller, comprising:

a forward wheel having a laterally extending axle with left and right axle end portions;

a laterally extending tubular rear axle, said axle having left and right ends;

a left rear wheel mounted to said left axle end;

a right rear wheel mounted to said right axle end;

left and right laterally spaced-apart base frame members, said left and right base frame members each having a forward end portion and a rearward end portion, said forward end portion having a flat portion with a notch therein sized to receive a corresponding one of said left and right forward wheel axle end portions therein with said forward wheel positioned between said forward end portions of said left and right base frame members, said forward end portions of said left and right base frame members being rigidly connected together by a base frame attachment member extending therebetween at a location rearward of said front wheel, said rearward end portion having a flat portion with a hole formed therein sized to rotatably receive said rear axle therein;

a spacer tube coaxially mounted on said rear axle between said rearward end portions of said left and right base frame members and extending fully therebetween, said spacer tube having left and right end walls sized relative to said holes in said rearward end portions of said base frame members to prevent inward movement of said rearward end portions of said base frame members on said rear axle;

left and right generally upright frame members each having an upper end portion and a lower end portion, said lower end portion of said left upright frame member being fixedly attached to said rear axle toward said left end thereof and laterally outward of said rearward end portion of said left base frame member to prevent laterally outward movement of said rearward end portion of said left base frame member on said rear axle, and said lower end portion of said right upright frame member being fixedly attached to said rear axle toward said right end thereof and laterally outward of said rearward end portion of said right base frame member to prevent laterally outward movement of said rearward end portion of said right base frame member on said rear axle;

left and right inclined upper frame members, each having a lower forward end portion and a raised rearward end portion, the raised rearward end portions being attached together to form a handle for gasping by a user, said forward end portions of said left and right upper frame members being rigidly connected together to move as a unit by an upper frame attachment member extending therebetween and being removably attached to said left and right base frame members toward said forward end portions thereof, said upper end portions of said left and right upright frame members being pivotally attached to said left and right upper frame members, respectively, at a position toward said rearward end portions of said left and right upper frame members;

a coupler attached to at least one of said left and right base frame members, said coupler including a lower coupler member and an upper coupler member spaced apart therefrom to define a substantially unobstructed receiver opening therebetween sized to releasably receive therein said forward end portions of said left and right upper frame members and said upper frame attachment member; and a lock pin, at least said upper coupler member and said upper frame attachment member each having a hole therein sized and aligned to receive said lock pin to releasably secure said forward end portions of said left and right upper frame members in said receiver opening.

2. The baby stroller of claim 1 wherein said left and right base frame members are each fabricated from a flat bar.

3. The baby stroller of claim 1 wherein said left and right base frame members are each fabricated from a tube with a forward end portion thereof pinched to form said forward flat portion with said notch therein and with a rearward end portion thereof pinched to form said rearward flat portion with said hole formed therein.

4. The baby stroller of claim 1 wherein at least said forward end portions of said left and right base frame members are in spaced-apart parallel arrangement.

5. The baby stroller of claim 1 wherein at least one of said upper and lower coupler members have laterally outward end portions which extend toward the other of said upper and lower coupler members to provide a lateral guide as said forward end portions of said left and right upper frame members are moved into said receiver opening and prevent lateral movement thereof when in said receiver opening.

6. The baby stroller of claim 1 wherein said forward end portions of said left and right upper frame members are inclined at a preselected angle when the stroller is fully assembled, and said upper and lower coupler members are angularly oriented such that said receiver opening extends rearwardly with an upward angular orientation at said preselected angle and opens rearwardly.

7. The baby stroller of claim 1 wherein said lower end portions of said left and right upright frame members are welded to said rear axle.

8. The baby stroller of claim 1 wherein said left and right ends of said rear axle each have an axially extending, interiorly threaded interior chamber with an end opening, and said left and right rear wheels each have a correspondingly threaded stub axle threadably received in a corresponding one of said threaded interior chambers of said left and right ends of said rear axle.

9. The baby stroller of claim 1 further including left and right spacer tubes coaxially mounted on said rear axle, and wherein said rearward end portion of said left base frame member is spaced apart on said rear axle from said lower end portion of said left upright frame member with said left spacer tube positioned and extending fully therebetween to prevent laterally outward movement of said rearward end portion of said left base frame member on said rear axle, and wherein said rearward end portion of said right base frame member is spaced apart on said rear axle from said lower end portion of said right upright frame member with said right spacer tube positioned and extending fully therebetween to prevent laterally outward movement of said rearward end portion of said right base frame member on said rear axle.

10. A foldable baby stroller, comprising:
forward wheel having a laterally extending axle with left and right axle end portions;
a laterally extending tubular rear axle, said axle having left and right ends;
a left rear wheel mounted to said left axle end;
a right rear wheel mounted to said right axle end;

left and right laterally spaced-apart base frame members, said left and right base frame members each having a forward end portion and a rearward end portion, said forward end portion having a corresponding one of said left and right forward wheel axle end portions mounted thereto with said forward wheel positioned between said forward end portions of said left and right base frame members, said forward end portions of said left and right base frame members being rigidly connected together by a base frame attachment member extending therebetween at a location rearward of said front wheel, said rearward end portion having a flat portion with a hole formed therein sized to rotatably receive said rear axle therein;

a spacer tube coaxially mounted on said rear axle between said rearward end portions of said left and right base frame members and extending therebetween to prevent inward movement of said rearward end portions of said base frame members on said rear axle;

left and right generally upright frame members each having an upper end portion and a lower end portion, said lower end portion of said left upright frame member being attached to said rear axle toward said left end thereof and laterally outward of said rearward end portion of said left base frame member to prevent laterally outward movement of said rearward end portion of said left base frame member on said rear axle, and said lower end portion of said right upright frame member being attached to said rear axle toward said right end thereof and laterally outward of said rearward end portion of said right base frame member to prevent laterally outward movement of said rearward end portion of said right base frame member on said rear axle;

left and right upper frame members, each having a lower forward end portion and a raised rearward end portion, the raised rearward end portions being attached together to form a handle for grasping by a user, said forward end portions of said left and right upper frame members being rigidly connected together to move as a unit by an upper frame attachment member extending therebetween and being removably attached to said left and right base frame members toward said forward end portions thereof, said upper end portions of said left and right upright frame members being pivotally attached to said left and right upper frame members, respectively, at a position toward said rearward end portions of said left and right upper frame members;

a coupler attached to at least one of said left and right base frame members, said coupler including a lower coupler member and an upper coupler member spaced apart therefrom to define a substantially unobstructed receiver opening therebetween sized to releasably receive therein said forward end portions of said left and right upper frame members and said upper frame attachment member; and a lock pin, at least said upper coupler member and said upper frame attachment member each having a hole therein sized and aligned to receive said lock pin to releasably secure said forward end portions of said left and right upper frame members in said receiver opening.

11. The baby stroller of claim 10 wherein said left and right base frame members are each fabricated from a flat bar.

12. The baby stroller of claim 10 wherein said left and right base frame members are each fabricated from a tube with a rearward end portion thereof pinched to form said rearward flat portion with said hole formed therein.

13. The baby stroller of claim 10 wherein at least one of said upper and lower coupler members have laterally outward end portions which extend toward the other of said upper and lower coupler members to provide a lateral guide as said forward end portions of said left and right upper frame members are moved into said receiver opening and prevent lateral movement thereof when in said receiver opening.

14. The baby stroller of claim 10 wherein said forward end portions of said left and right upper frame members are inclined at a preselected angle when the stroller is fully assembled, and said upper and lower coupler members are angularly oriented such that said receiver opening extends rearwardly with an upward angular orientation at said preselected angle and opens rearwardly.

15. The baby stroller of claim 10 wherein said lower end portions of said left and right upright frame members are fixedly attached directly to said rear axle.

16. The baby stroller of claim 10 further including left and right spacer tubes coaxially mounted on said rear axle, and wherein said rearward end portion of said left base frame member is spaced apart on said rear axle from said lower end portion of said left upright frame member with said left spacer tube positioned and extending fully therebetween to prevent laterally outward movement of said rearward end portion of said left base frame member on said rear axle, and wherein said rearward end portion of said right base frame member is spaced apart on said rear axle from said lower end portion of said right upright frame member with said right spacer tube positioned and extending fully therebetween to prevent laterally outward movement of said rearward end portion of said right base frame member on said rear axle.

17. A foldable baby stroller, comprising:

forward wheel having a laterally extending axle with left and right axle end portions;

a laterally extending tubular rear axle, said axle having left and right ends;

a left rear wheel mounted to said left axle end;

a right rear wheel mounted to said right axle end;

left and right laterally spaced-apart base frame members, said left and right base frame members each having a forward end portion and a rearward end portion, said forward end portion having a corresponding one of said left and right forward wheel axle end portions mounted thereto with said forward wheel positioned between said forward end portions of said left and right base frame members, said forward end portions of said left and right base frame members being rigidly connected together by a base frame attachment member extending therebetween at a location rearward of said front wheel, said rearward end portion having a flat portion with a hole formed therein sized to rotatably receive said rear axle therein;

stops mounted on said rear axle laterally inward of said rearward end portions of said left and right base frame members to prevent inward movement of said rearward end portions of said base frame members on said rear axle;

left and right generally upright frame members each having an upper end portion and a lower end portion, said lower end portions of said left and right upright frame members being attached to said rear axle;

stops mounted on said rear axle laterally outward of said rearward end portions of said left and right base frame members to prevent laterally outward movement of said rearward end portions on said rear axle;

left and right upper frame members, each having a lower forward end portion and a raised rearward end portion, the raised rearward end portions being attached together to form a handle for gasping by a user, said forward end portions of said left and right upper frame members being rigidly connected together to move as a unit by an upper frame attachment member extending therebetween and being removably attached to said left and right base frame members toward said forward end portions thereof, said upper end portions of said left and right upright frame members being pivotally attached to said left and right upper frame members, respectively, at a position toward said rearward end portions of said left and right upper frame members;

a coupler attached to at least one of said left and right base frame members, said coupler including a lower coupler member and an upper coupler member spaced apart therefrom to define a substantially unobstructed receiver opening therebetween sized to releasably receive therein said forward end portions of said left and right upper frame members and said upper frame attachment member; and a lock pin, at least said upper coupler member and said upper frame attachment member each having a hole therein sized and aligned to receive said lock pin to releasably secure said forward end portions of said left and right upper frame members in said receiver opening.

18. The baby stroller of claim 17 wherein said left and right base frame members are each fabricated from a flat bar.

19. The baby stroller of claim 17 wherein said left and right base frame members are each fabricated from a tube with a rearward end portion thereof pinched to form said rearward flat portion with said hole formed therein.

20. The baby stroller of claim 17 wherein at least one of said upper and lower coupler members have laterally outward end portions which extend toward the other of said upper and lower coupler members to provide a lateral guide as said forward end portions of said left and right upper frame members are moved into said receiver opening and prevent lateral movement thereof when in said receiver opening.

21. The baby stroller of claim 17 wherein said forward end portions of said left and right upper frame members are inclined at a preselected angle when the stroller is fully assembled, and said upper and lower coupler members are angularly oriented such that said receiver opening extends rearwardly with an upward angular orientation at said preselected angle and opens rearwardly.

22. The baby stroller of claim 17 wherein said lower end portions of said left and right upright frame members are fixedly attached directly to said rear axle.

23. A foldable baby stroller, comprising:

a forward wheel;

a base frame having left and right laterally spaced-apart base frame members and a laterally extending rear axle, said left and right base frame members each having a forward end portion and a rearward end portion, said forward end portions having said forward wheel mounted therebetween, said rearward end portion being attached to said rear axle;

a left rear wheel mounted toward a left end of said rear axle;

a right rear wheel mounted toward a right end of said rear axle;

left and right generally upright frame members each having an upper end portion and a lower end portion, said lower end portions of said left and right upright frame members being attached to said base frame toward said rear axle;

left and right upper frame members, each having a lower forward end portion and a raised rearward end portion, the raised rearward end portions being attached together to form a handle for grasping by a user, said forward end portions of said left and right upper frame members being rigidly connected together to move as a unit by an upper frame attachment member extending therebetween, said upper end portions of said left and right upright frame members being pivotally attached to said left and right upper frame members, respectively, at a position toward said rearward end portions of said left and right upper frame members;

a coupler attached to said left and right base frame members and rigidly connecting said left and right base members together at a location rearward of said front wheel, said coupler including a lower coupler member and an upper coupler member spaced apart therefrom to define a substantially unobstructed receiver opening therebetween sized to releasably receive therein said forward end portions of said left and right upper frame members and said upper frame attachment member; and a lock pin, at least said upper coupler member and said upper frame attachment member each having a hole therein sized and aligned to receive said lock pin to releasably secure said forward end portions of said left and right upper frame members in said receiver opening.

24. The baby stroller of claim 23 wherein at least one of said upper and lower coupler members have laterally outward end portions which extend toward the other of said upper and lower coupler members to provide a lateral guide as said forward end portions of said left and right upper frame members are moved into said receiver opening and prevent lateral movement thereof when in said receiver opening.

25. The baby stroller of claim 23 wherein said forward end portions of said left and right upper frame members are inclined at a preselected angle when the stroller is fully assembled, and said upper and lower coupler members are angularly oriented such that said receiver opening extends rearwardly with an upward angular orientation at said preselected angle and opens rearwardly.

26. A foldable baby stroller, comprising:

a forward wheel;

a base frame having left and right laterally spaced-apart base frame members and a laterally extending rear axle, said left and right base frame members each having a forward end portion and a rearward end portion, said forward end portions having said forward wheel mounted therebetween, said rearward end portion being attached to said rear axle:

a left rear wheel mounted toward a left end of said rear axle;

a right rear wheel mounted toward a right end of said rear axle;

left and right generally upright frame members each having an upper end portion and a lower end portion, said lower end portions of said left and right upright frame members being attached to said base frame toward said rear axle;

left and right upper frame members, each having a lower forward end portion and a raised rearward end portion, the raised rearward end portions being attached together to form a handle for grasping by a user, said forward end portions of said left and right upper frame members being rigidly connected together to move as a unit by an upper frame attachment member extending therebetween, said upper end portions of said left and right upright frame members being pivotally attached to said left and right upper frame members, respectively, at a position toward said rearward end portions of said left and right upper frame members;

a coupler attached to said base frame at a location rearward of said front wheel, said coupler including a lower coupler member and an upper coupler member spaced apart therefrom to define a receiver opening therebetween sized to releasably receive therein said forward end portions of said left and right upper frame members; and a lock pin, at least said upper coupler member and said upper frame attachment member each having a hole therein sized and aligned to receive said lock pin to releasably secure said forward end portions of said left and right upper frame members in said receiver opening.

27. The baby stroller of claim 26 wherein at least one of said upper and lower coupler members have laterally outward end portions which extend toward the other of said upper and lower coupler members to provide a lateral guide as said forward end portions of said left and right upper frame members are moved into said receiver opening and prevent lateral movement thereof when in said receiver opening.

28. The baby stroller of claim 26 wherein said forward end portions of said left and right upper frame members are inclined at a preselected angle when the stroller is fully assembled, and said upper and lower coupler members are angularly oriented such that said receiver opening extends rearwardly with an upward angular orientation at said preselected angle and opens rearwardly.

* * * * *